United States Patent
Choi et al.

(10) Patent No.: US 10,251,084 B2
(45) Date of Patent: Apr. 2, 2019

(54) METHOD FOR MULTI-RAT SCHEDULING AND APPARATUS THEREFOR IN SYSTEM IN WHICH HETEROGENEOUS WIRELESS COMMUNICATION TECHNOLOGIES ARE UTILIZED

(71) Applicant: LG ELECTRONICS INC., Seoul (KR)

(72) Inventors: Hyeyoung Choi, Seoul (KR); Heejeong Cho, Seoul (KR); Hyunsoo Ko, Seoul (KR); Ilmu Byun, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/507,234

(22) PCT Filed: Nov. 3, 2014

(86) PCT No.: PCT/KR2014/010434
§ 371 (c)(1),
(2) Date: Feb. 27, 2017

(87) PCT Pub. No.: WO2016/043377
PCT Pub. Date: Mar. 24, 2016

(65) Prior Publication Data
US 2017/0290021 A1 Oct. 5, 2017

Related U.S. Application Data (60) Provisional application No. 62/052,486, filed on Sep. 19, 2014.

(51) Int. Cl.
| | |
|---|---|
| *H04W 4/00* | (2018.01) |
| *H04W 28/02* | (2009.01) |
| *H04W 72/04* | (2009.01) |
| *H04W 72/12* | (2009.01) |
| *H04W 88/10* | (2009.01) |

(Continued)

(52) U.S. Cl.
CPC ....... *H04W 28/0278* (2013.01); *H04L 5/0035* (2013.01); *H04L 5/0053* (2013.01);
(Continued)

(58) Field of Classification Search
CPC . H04W 28/02; H04W 28/0278; H04W 28/08; H04W 72/0406; H04W 72/06;
(Continued)

(56) References Cited

U.S. PATENT DOCUMENTS 9,635,655 B2 * 4/2017 Jha ................. H04W 72/0413
9,722,743 B2 * 8/2017 Li .......................... H04W 28/08
(Continued)

FOREIGN PATENT DOCUMENTS

| EP | 2723144 | 4/2014 |
|---|---|---|
| KR | 10-2012-0062788 | 6/2012 |

(Continued)

OTHER PUBLICATIONS

PCT International Application No. PCT/KR2014/010434, Written Opinion of the International Searching Authority dated May 29, 2015, 12 pages.

(Continued)

*Primary Examiner* — Frank Duong
(74) *Attorney, Agent, or Firm* — Lee, Hong, Degerman, Kang & Waimey (57) ABSTRACT

The present invention relates to a method for multi-RAT scheduling, and an apparatus therefor, in a heterogeneous wireless communication system. A cellular controller, which controls a terminal in a cellular network, receives a multi-RAT buffer status report from a terminal, determines a UL resource for each corresponding heterogeneous wireless communication network, transmits a multi-RAT BSR response message corresponding to the buffer status report to the terminal, and allocates the UL resource to the terminal
(Continued)

by means of the heterogeneous wireless communication network.

5 Claims, 8 Drawing Sheets

(51) Int. Cl.
*H04W 72/06* (2009.01)
*H04L 5/00* (2006.01)
*H04W 28/08* (2009.01)

(52) U.S. Cl.
CPC ....... *H04W 72/0406* (2013.01); *H04W 72/06* (2013.01); *H04W 72/1226* (2013.01); *H04W 72/1278* (2013.01); *H04W 72/1284* (2013.01); *H04W 88/10* (2013.01); *H04L 5/003* (2013.01); *H04L 5/0032* (2013.01); *H04W 28/08* (2013.01)

(58) Field of Classification Search
CPC . H04W 72/12; H04W 72/1226; H04W 88/10; H04L 5/003
See application file for complete search history.

(56) References Cited

U.S. PATENT DOCUMENTS

| | | | |
|---|---|---|---|
| 2014/0004849 | A1 | 1/2014 | Su et al. |
| 2014/0269352 | A1 | 9/2014 | Sun et al. |
| 2014/0321376 | A1* | 10/2014 | Damnjanovic ... H04W 72/1215 370/329 |
| 2015/0043492 | A1 | 2/2015 | Baek et al. |
| 2015/0358838 | A1* | 12/2015 | Wei ..................... H04W 76/15 370/228 |

FOREIGN PATENT DOCUMENTS

| | | |
|---|---|---|
| KR | 10-2012-0130254 | 11/2012 |
| KR | 10-2013-0114456 | 10/2013 |
| WO | 2013180955 | 12/2013 |

OTHER PUBLICATIONS

United States Patent and Trademark Office U.S. Appl. No. 15/507,144, Office Action dated Jun. 12, 2018, 24 pages.

\* cited by examiner

METHOD FOR MULTI-RAT SCHEDULING AND APPARATUS THEREFOR IN SYSTEM IN WHICH HETEROGENEOUS WIRELESS COMMUNICATION TECHNOLOGIES ARE UTILIZED

CROSS-REFERENCE TO RELATED APPLICATIONS

This application is a National Stage filing under 35 U.S.C. 371 of International Application No. PCT/KR2014/010434, filed on Nov. 3, 2014, which claims the benefit of U.S. Provisional Application No. 62/052,486, filed on Sep. 19, 2014, the contents of which are all hereby incorporated by reference herein in its entirety.

BACKGROUND OF THE INVENTION

Field of the Invention

The present invention relates to mobile communication, and more particularly, to a method for multi-RAT scheduling and an apparatus therefor, in a system in which heterogeneous wireless communication technologies are utilized.

Related Art

Nowadays, an LTE-A based communication service may provide a much faster speed than wire Internet to users. Accordingly, a user equipment that may receive an IP based service based on a cellular network such as LTE-A is widely used. The user uses an Internet Protocol (IP) based service such as Voice over LTE (VoLTE) and audiovisual communication through a user equipment. It is estimated that such an LTE-A based wireless Internet service will further increase.

Various communication systems such as LTE or LTE-A and a Wireless Local Area Network (WLAN), mobile World Interoperability for Microwave Access (WiMAX), and High Speed Downlink Packet Access (HSDPA) in which a transmission speed, coverage per base station, mobility, and a data use cost are different may be used as a next generation mobile communication network. That is, a plurality of radio access technologies (RAT) may coexist, and the user may select and access a network according to preference or a peripheral communication environment.

Specifically, current mobile devices such as a smart phone and a smart pad simultaneously have a 4G long term evolution-advanced (LTE-A) interface and a wireless local area network (WLAN) interface. Further, mobile communication providers support a wireless Internet service through a WiFi zone as well as a 4G network having wide coverage.

As a service is provided to the terminal through such a cellular network and WLAN network, various portions such as handover and data offloading should be considered.

SUMMARY OF THE INVENTION

The present invention proposes a method in which a cellular controller dynamically allocates resources for a cellular network and a WLAN based on a multi-RAT integration buffer status report sent by a multi-RAT UE, while the cellular controller is obtaining information on the channel status, load, etc. of the cellular network and the WLAN.

An exemplary embodiment of the present invention provides a UL scheduling method using a heterogeneous wireless communication network, the method including: receiving a multi-RAT buffer status report from a UE; determining UL resources separately to cope with the heterogeneous wireless communication network; sending a multi-RAT BSR response message to the UE as a response to the buffer status report; and allocating the UL resources to the UE over the heterogeneous wireless communication network.

The heterogeneous wireless communication network may include a cellular network and a WLAN, and may further include sending buffer status information on the WLAN to a WLAN access device when the UL resources are determined.

The method may further include, upon receiving a failure message from the WLAN access device in response to the buffer status information, allocating UL resources that were originally allocated for the WLAN as UL resources for the cellular network.

The multi-RAT BSR response message may contain information on a wireless network the UE has to monitor.

The multi-RAT BSR response message may contain information on the monitoring time of the wireless network the UE has to monitor.

According to the present invention, there is provided a method in which a cellular controller dynamically allocates resources for a cellular network and a WLAN based on a multi-RAT integration buffer status report sent by a multi-RAT UE, while the cellular controller is obtaining information on the channel status, load, etc. of the cellular network and the WLAN.

This allows for efficient UL data transmission.

DESCRIPTION OF EXEMPLARY EMBODIMENTS

A wireless device may be fixed or may have mobility and may be referred to as different terms such as a User Equipment (UE), a mobile station (MS), a user terminal (UT), a subscriber station (SS), and a mobile terminal (MT). Further, the terminal may be a device that can carry and having a communication function, such as a mobile phone, a personal digital assistant (PDA), a smart phone, a wireless modem, and a notebook computer or may be a device that cannot carry, such as a personal computer (PC) and a vehicle mounting device. A base station indicates a fixed station that generally communicates with a wireless device and may be referred to as different terms such as an evolved-NodeB (eNB), a Base Transceiver System (BTS), and an access point.

Hereinafter, it will be described that the present invention is applied based on 3rd Generation Partnership Project (3GPP) long term evolution (LTE) or 3GPP LTE-Advanced (LTE-A). This is only an illustration and the present invention may be applied to various wireless communication systems. Hereinafter, LTE may include LTE and/or LTE-A.

This specification describes a communication network as an object, and a work that performs in a communication network may be performed in a process in which a system (e.g., a base station) that controls the communication network controls a network and transmits data or a work may be performed in a terminal linked to the network.

Figure 1:
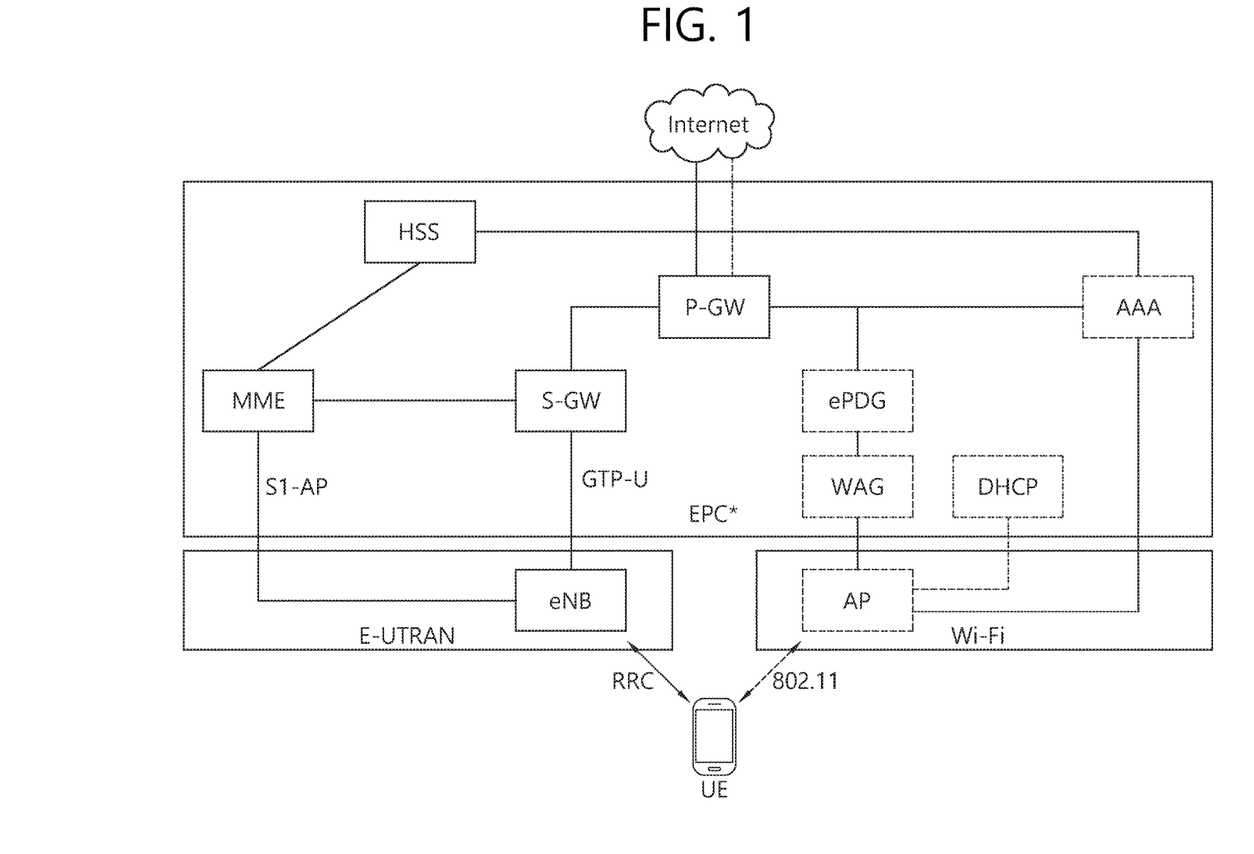
FIG. 1 is a conceptual diagram illustrating a method of transmitting and/or receiving data based on a heterogeneous network system.

FIG. 1 is a conceptual diagram illustrating a method of transmitting and/or receiving data based on a heterogeneous network system.

FIG. 1 illustrates a wireless communication method of a Station (STA) based on interworking between a WLAN system and a cellular network (e.g., a network based on an LTE system and an LTE-A system) system among heterogeneous network systems (or a plurality of radio access technology (RAT) systems). Hereinafter, the STA means a UE that may be fixed or may have mobility and hereinafter, the STA is represented with a UE.

Referring to FIG. 1, the UE may have a capability that can access to both an Access point (AP) of a WLAN and an eNB of a cellular network. In order to access to a specific network among the WLAN and the cellular network, the UE may request connection to the specific network. When switching based multi-RAT access technology is applied, even if the UE may access to each heterogeneous network, the UE cannot simultaneously access to the entire heterogeneous network.

The eNB may be connected to a serving gateway (S-GW)/mobility management entity (MME) through a cellular network interface.

An MME has access information of the UE or information about a capability of the UE, and such information may be generally used for mobility management of the UE. The MME performs a function of a control plane.

The S-GW is a gateway having an E-UTRAN as a terminal point. The S-GW performs a function of a user plane. The S-GW/MME is connected to a packet data network (PDN) gateway (P-GW) and a home subscriber server (HSS) through a cellular network interface. The PDN-GW is a gateway having a PDN as a terminal point.

Further, the P-GW and the HSS are connected to a 3GPP access authentication authorization (AAA) server through the cellular network interface. The P-GW and the 3GPP AAA server may be connected to an evolved packet data gateway (e-PDG) through the cellular network interface. The e-PDG may be included only in unreliable non-3GPP access. A WLAN access gateway (WAG) may perform a function of a P-GW in a WLAN system.

Conventional communication on heterogeneous network through a WLAN and cellular network was performed based on a request of a UE. In an existing case, UE request based interworking of a method in which a specific network server manages WLAN information and performs handover between a WLAN and a cellular network by a request of the UE was performed rather than direct interworking between a WLAN and a cellular network.

Further, upon communicating on a heterogeneous network, the control of a radio level was not performed, and only flow mobility/IP-flow mapping of a network level was supported.

That is, in communication on a conventional heterogeneous network, connection for transmission and/or reception of direct control information between a WLAN and a cellular network was not required.

However, in order to increase efficiency of a UE that performs communication based on the WLAN and the cellular network, communication on a heterogeneous network based on direct interworking between the WLAN and the cellular network is required rather than communication on a heterogeneous network based on a request of the UE. When transmission and reception of direct control information between the WLAN and the cellular network is performed, efficient and fast interworking between the WLAN and the cellular network may be performed.

In an existing WLAN environment, as the number of UEs increases, a resource using when the UE accesses may increase in proportional thereto.

An endless user request for bandwidth extension causes congestion increase and reduction of a relative transmission speed of an entire wireless network. Therefore, in order to guarantee a service of an application requiring a strict Quality of Service (QoS) even in a network of high congestion, a network manager requires a new mechanism, and due to such requirements, a more enhanced Medium Access Control (MAC) protocol than that in an existing WLAN was finally developed.

An IEEE 802.11 MAC protocol defines a Distributed Coordination Function (DCF), which is an essential function and a Point Coordination Function (PCF), which is a selection function. That is, a transmission medium may operate in both a DCF, which is a contention mode and a PCF, which is a contention free mode.

The DCF is an asynchronous transmitting method, provides a basic medium access method of 802.11 MAC, and is implemented in an entire commercial WLAN product. The DCF does not consider a priority between stations (a UE, hereinafter, may be referred to as 'STA') in wireless medium access. A characteristic of such a DCF does not reflect various forms of data traffic transmission and thus the DCF cannot finally support a QoS in which a user requires.

A synchronous transmitting method is a medium access method through polling and is implemented by a PCF. The PCF uses a central control type polling function of locating a Point Coordination (PC) function at a base station of the center to enable the base station to directly control a service of an entire STA. That is, in order to give an opportunity that may transmit a frame to each STA, the base station periodically performs polling of coupled STAs.

The DCF may not satisfy QoS requirements required for real time data transmission. In order to compensate this, various techniques that provide a QoS by adjusting a DCF function provided in 802.11 MAC were appeared. In order to provide a more advanced QoS in a WLAN, 802.11e MAC is provided in which existing 802.11 MAC is compensated. 802.11e prescribes a Hybrid Coordination Function (HCF) based on existing 802.11 MAC protocol DCF and PCF. The HCF includes a new medium approach mechanism for enhancing a QoS of a WLAN and may transmit QoS data in both a contention cycle and a non-contention cycle.

In a power saving mode of a UE according to 802.11, a sleep mode, i.e., a doze mode is defined.

In a doze mode, in order to save power of the UE, when data in which the UE is to transmit do not exist or when data to be transmitted to the UE do not exist, operation of a transceiver may be stopped for a predetermined time.

By describing a listen interval of an initial association request frame, the UE may be changed from an awake mode to a doze mode, the UE may transmit a null data frame in which a value of a power management field of a MAC header is set to 1, as needed, receive an ACK signal thereof, and enter from an awake mode to a doze mode.

In a doze mode, the UE may temporarily awake, determine beacon frame around a time point in which a beacon frame is transmitted, and determine a Traffic Indication map (TIM) information element.

When a bit value corresponding to an association id in a wireless local area network system (AID) thereof is set to 1 at a TIM, the UE awakes and transmits a poll to an assigned resource according to an AID thereof at a duration of a Power Save (PS)-Poll message, thereby being changed from a doze mode to an awake mode.

An AP, having received such a PS-Poll frame may transmit data while buffering to the UE. When a buffered frame is at least one, the AP may set more data bit to 1 and notify the UE that a frame further exists.

In a cellular network, for example LTE, a paging procedure is as follows.

The UE may operate in a sleep mode according to a Discontinuous Reception triggering (DRX) parameter value using DRX triggering information included in an RRC connection environment setup message.

Figure 2:
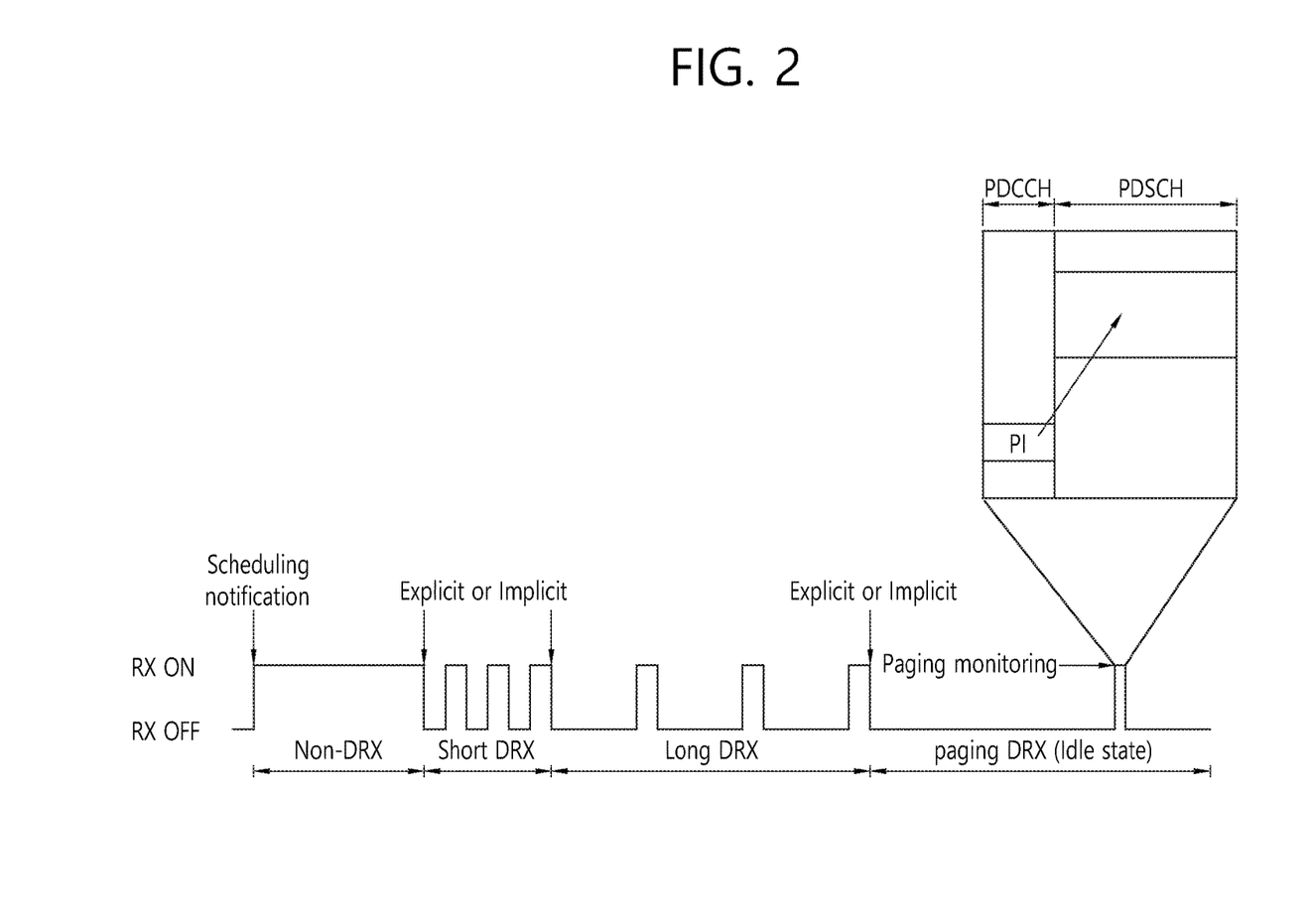
FIG. 2 is a diagram illustrating a DRX mode of a UE.

FIG. 2 is a diagram illustrating a DRX mode of a UE.

As shown in FIG. 2, the UE that receives no data for a predetermined time may be changed to a non-DRX (active mode)→a short DRX (short sleep mode)→a long DRX (long sleep mode)→a paging DRX (paging idle mode).

When the UE detects that scheduled data exist through a control channel for a listening interval, the UE may convert a mode thereof to a non-DRX mode and receive data. Such a DRX may be configured through a BCCH and a Non Access Stratum (NAS).

Here, when the UE is in an idle state, a location of the UE is managed in a tracking area (TA) unit by an MME, and a base station such as an eNB releases entire information of the UE.

In this case, in order to receive DL data that may be transmitted to the UE, the UE accessed to a cellular network may awake at every paging DRX duration cycle and determine a paging channel (PCH) thereof.

The UE may awake in a subframe assigned thereto at every paging DRX thereof to monitor a PCH and determine whether a paging message transmitted by blind decoding with a Paging Radio Network Temporary Identifier (RNTI) exists.

When a plurality of UEs are connected, a paging group may be transmitted to a Physical Downlink Control Channel (PDCCH), and an individual UE may be identified in a PCH.

Only one subframe may be assigned in a paging interval of the UE, and a network may distribute UEs at different paging events. In this case, for a PCH, one paging RNTI may be used.

A paging message may include information about at least one UE ID, Earthquake and Tsunami Warning System Notification (ETWS Notification), and System Information Change Notification (SI Change Notification).

Meanwhile, a multi-RAT UE managed buffers for a cellular network and a WLAN separately, and sent a buffer status report (BSR) on the cellular network to the cellular network but did not send a BSR on the WLAN to an AP, i.e., the WLAN's access device.

802.11 ax, which is a next-generation standard for WLAN, introduces techniques in which a UE sends a BSR on a WLAN to an AP to improve the spectral efficiency of the WLAN. In order to use such information, there is a need for discussion on methods of newly defining a trigger frame and scheduling uplink resources for a UE connected to a WLAN.

In a case where a multi-RAT UE transmits a specific bearer in a split manner to a cellular network and a WLAN, the data transfer time for the multi-RAT UE can be reduced by managing a cellular network buffer and a WLAN buffer in an integrated fashion and dynamically allocating resources depending on the channel status, load, etc. of the cellular network and the WLAN, rather than by managing the cellular network buffer and the WLAN buffer separately. In light of this, it is anticipated that the overall performance of communication systems will be improved.

The present invention proposes a method in which a cellular controller dynamically allocates resources for a cellular network and a WLAN based on a multi-RAT integration buffer status report sent by a multi-RAT UE, while the cellular controller is obtaining information on the channel status, load, etc. of the cellular network and the WLAN.

That is, the present invention proposes a method in which a cellular controller decides to perform scheduling for a cellular network and a WLAN and gives instructions on this.

Figure 3:
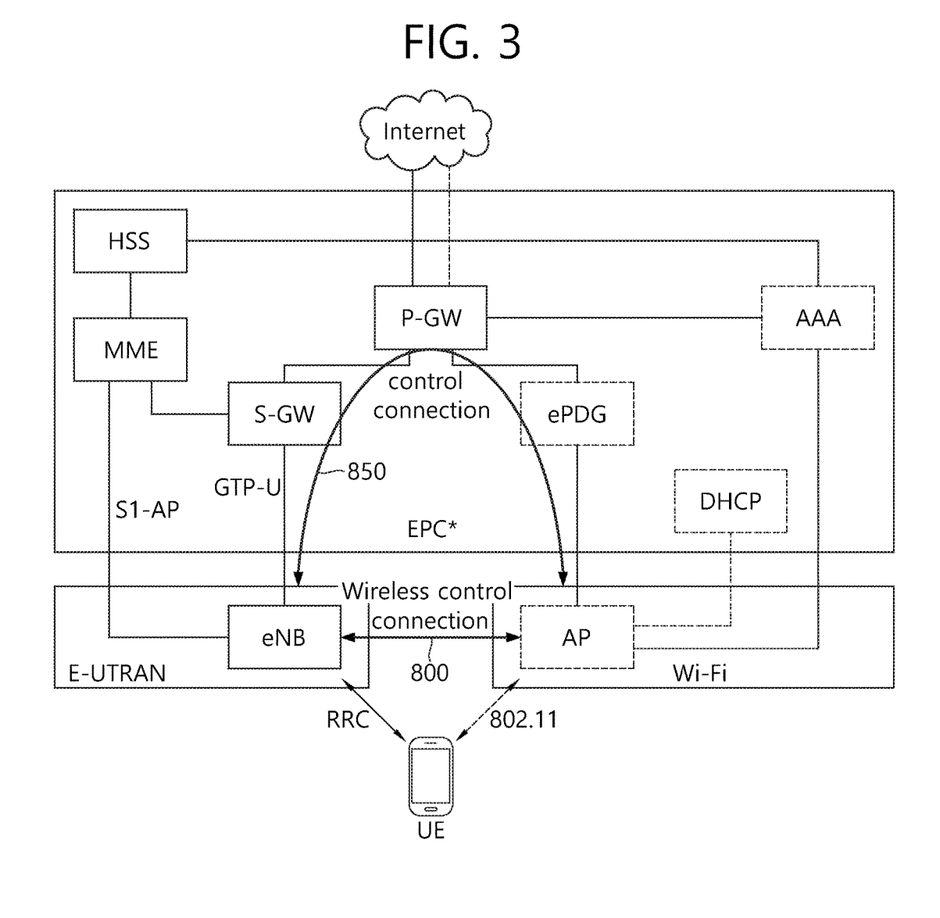
FIG. 3 is a conceptual diagram illustrating interworking between a WLAN and a cellular network according to an exemplary embodiment of the present invention.

FIG. 3 is a conceptual diagram illustrating interworking between a WLAN and a cellular network according to an exemplary embodiment of the present invention.

Referring to FIG. 3, offloading of data may be performed and a maximum processing amount of data may increase through interworking between a WLAN and a cellular network.

A WLAN polling operation based on a cellular network according to an exemplary embodiment of the present invention may be performed based on the following connection between the WLAN and the cellular network.

A wireless control connection 200 may be performed between the eNB and the AP. Further, a wired control connection 250 may be performed through an S-GW, a P-GW, and an ePDG of the EPC. The wired control connection 250 may be performed based on a new interface through a backbone network based on a GPRS tunneling protocol (GTP) or a new protocol. The wireless control connection 200 may be connection between the eNB and the AP. For the wireless control connection 200, the AP may support an LTE protocol stack for communication with the eNB as well as a 802.11 MAC/PHY layer.

According to an exemplary embodiment of the present invention, interworking between a WLAN and a cellular network may be directly performed within a core network such as an evolved packet core (EPC). That is, control information between the WLAN and the cellular network may be directly transmitted and received within a core network.

When the UE may access to both the WLAN and the cellular network, a cellular network system having wide coverage and that transmits control information may be referred to as a primary system, and a WLAN system having narrow coverage and that transmits data may be referred to as a secondary system.

When performing a WLAN polling operation based on a cellular network according to an exemplary embodiment of the present invention, for interworking between the cellular network and the WLAN, an entity related to the cellular network may be used. For example, an existing entity such as an eNB, an MME, and a P-GW may be used for interworking between the cellular network and the WLAN. Alternatively, a new entity for interworking between the cellular network and the WLAN such as an InterWorking Management Entity (IWME) (not shown) may be defined in a core network.

In entities for interworking between heterogeneous networks, an interworking function may be implemented. The interworking function may define a procedure for interworking between heterogeneous networks in a wireless network level and a core network level. An entity for interworking between heterogeneous networks may store and manage information related to an AP.

Hereinafter, it is assumed that the UE is a dual mode UE that can support a WLAN and a cellular network.

Figure 4:
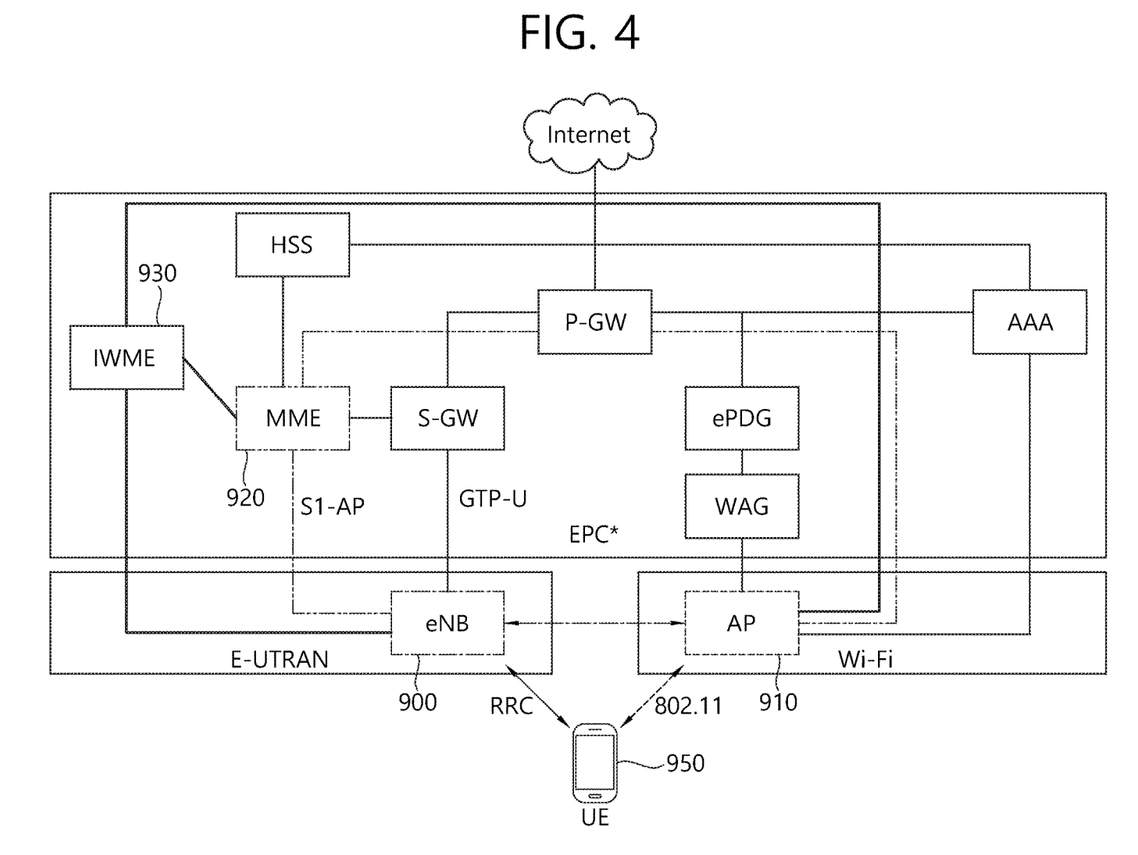
FIG. 4 is a conceptual diagram illustrating a method of managing AP information according to an exemplary embodiment of the present invention.

FIG. 4 is a conceptual diagram illustrating a method of managing AP information according to an exemplary embodiment of the present invention.

FIG. 4 illustrates a method in which a cellular network controls an AP of a WLAN and manages information about the AP.

Referring to FIG. 4, for the control of an AP 310, an air interface between an eNB 300 and the AP 310 may be used. The eNB 310 may control the AP 310 similarly to a general UE that communicates with the eNB 300 based on wireless control connection between the APs 310.

Alternatively, the eNB 300 may control the AP 310 based on a backhaul interface between the eNB 300 and the AP 310. The eNB 300 may control the AP based on a wired control connection.

Alternatively, the eNB 300 may control the AP 310 based on a control interface between an MME 320 and the AP 310. The AP 310 may be controlled based on control connection between the MME 320 and the AP 310, i.e., between the MME 320 and the secondary system of the core network of the cellular network. In order to control the AP based on the MME 320, a wireless control connection between the eNB 300 and the AP 310 may be used.

Alternatively, a control interface between an IWME 330 and the AP 310 may be used for the control of the AP 310. That is, the AP 310 may be controlled based on control connection between the IWME 330 and the secondary system. In this case, in order to control the AP based on the IWME 330, a wireless control connection between the eNB 300 and the AP 310 may be used.

Hereinafter, in a cellular-WLAN fusion environment in which interworking between a WLAN and a cellular network is available, a method in which the multi-RAT UE performs a multi-RAT integration BSR is suggested. Specifically, a method of preparing a multi-RAT integration BSR and the BSR will be described in detail.

Figure 5:
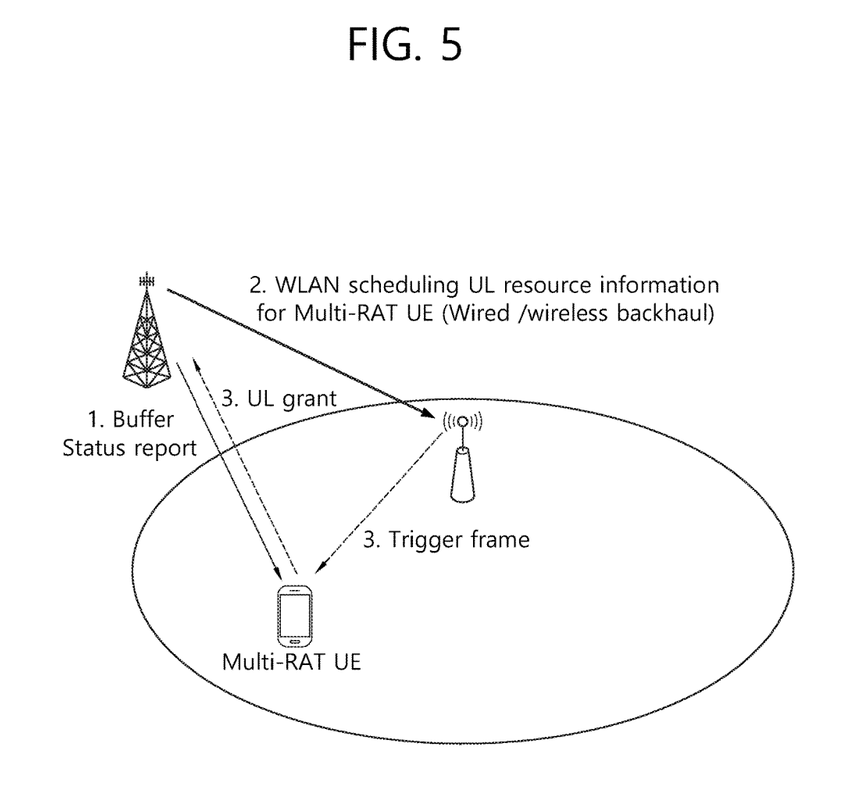
FIG. 5 is a diagram illustrating dynamic multi-RAT scheduling according to an exemplary embodiment of the present invention.

FIG. 5 is a diagram illustrating dynamic multi-RAT scheduling according to an exemplary embodiment of the present invention. Hereinafter, a subject that receives a BSR from the UE in a cellular network is referred to as a cellular controller. The cellular controller may be implemented with a base station or the eNB, the MME, or the IWME of FIG. 4.

The cellular controller may receive a WLAN buffer status report (BSR) of a multi-RAT UE (1. Buffer status report).

The cellular controller may transmit WLAN scheduling UL resource information of the multi-RAT UE to the AP based on such information (2. WLAN Scheduling UL resource information of the multi-RAT UE). Such communication between the cellular controller and the AP may be performed through wired/wireless backhaul.

The cellular controller may transmit a UL grant signal to the multi-RAT UE based on WLAN scheduling resource information (3. UL grant), and the AP may also notify the multi-RAT UE of a trigger frame based on WLAN scheduling UL resource information received from the cellular controller (3. Trigger frame).

In a multi-RAT environment, upon performing uplink, the multi-RAT UE may split and transmit a bearer into a cellular network and a WLAN. In this case, the bearer may be split from a Packet data convergence protocol (PDCP) level and may be split from a radio link control (RLC) or a medium access control (MAC) level.

When a wireless access device for communication through a WLAN, for example a base station, for example an eNB for communication through an AP and a cellular network is physically or logically collocated into one, for split transmission of a bearer, a new interface between the AP and the base station is not required.

However, when the AP and the base station do not have a collocated structure, for split transmission of a bearer, a new interface may be required between the AP and the base station. In such a case, it may be adaptively implemented through individual interworking between an LTE protocol and a WLAN protocol that a bearer input to the cellular network is split from which level to be transmitted to the AP.

In order to enhance a data transmitting rate of the multi-RAT UE, as described above, when the multi-RAT UE determines to split and to UL transmit a specific bearer through the cellular network and the WLAN, the cellular network may configure UL bearer split to the multi-RAT UE.

Figure 6:
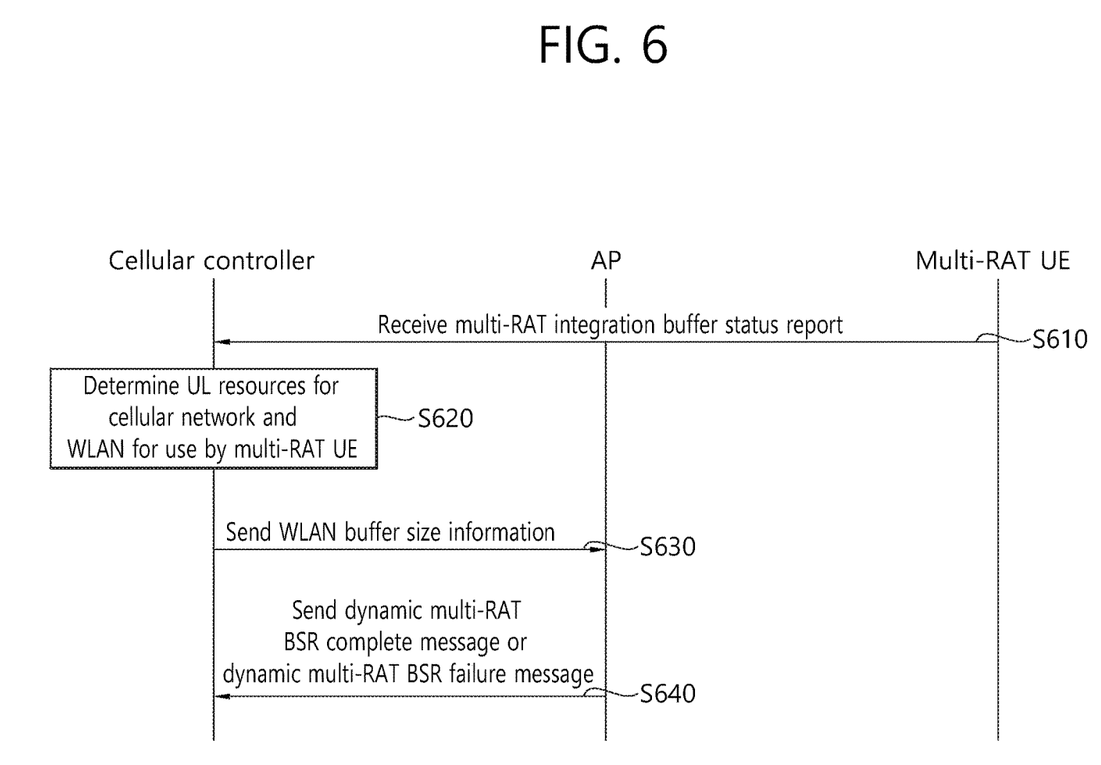
FIG. 6 is a control flowchart illustrating a dynamic multi-RAT integrated scheduling decision method according to an exemplary embodiment of the present invention.

FIG. 6 is a control flowchart illustrating a dynamic multi-RAT integrated scheduling decision method according to an exemplary embodiment of the present invention.

Firstly, a cellular controller may receive a buffer status report (hereinafter, BSR) from a multi-RAT UE (S610).

A multi-RAT integration BSR according to the present invention may be configured differently from the exiting BSR so as to indicate the buffer status of a cellular network and a WLAN. For example, the multi-RAT integration BSR may consist of information on whether the multi-RAT UE supports dynamic multi-RAT integrated scheduling, a Logical Channel Group (LCG) ID field, and a buffer size field containing buffer size information, or may consist of information whether the multi-RAT UE supports dynamic multi-RAT integrated scheduling and a field representing the buffer size of an LCG, which is a combination of an LCG ID field and a buffer size field.

Having received the BSR, the cellular controller may determine UL resources for the cellular network and WLAN for use by the multi-RAT UE by using information such as the buffer data size, the channel status of the cellular network and WLAN, the QoS of a bearer, etc., received from the multi-RAT UE (S620).

The cellular controller may send WLAN buffer size information to an AP so that the multi-RAT UE can transmit, over the WLAN, data corresponding to the data size of the multi-RAT integration buffer received from the multi-RAT UE, excluding the data that can be transmitted in the uplink resources scheduled for the cellular network for use by the multi-RAT UE (S630).

That is, the cellular controller sends to the AP a dynamic multi-RAT integration BSR, which is a BSR on the overall UL data size, excluding the data that can be transmitted in the UL resources for the cellular network.

The multi-RAT integration BSR may be sent using wired/wireless interfaces between the cellular controller and the AP.

The dynamic multi-RAT integration BSR may consist of information such as the BSSID of the AP, the AID of the UE, the data size, the bearer's DRB (Distributed Resource Block) or LC/LCG ID), the AC (access category), etc.

For example, in a case where the multi-RAT UE has notified the cellular controller through a BSR that the multi-RAT integration buffer has a data size of 15,000 bytes, the cellular controller may decide to transmit data of 1,000 bytes over the cellular network and data of 5,000 bytes over the WLAN, depending on the load, channel status, etc. of the cellular network/WLAN. The cellular controller may transmit to the AP information such as the BSSID of the AP, the AID of the UE, 5,000 bytes, (DRB #2), AC #0, etc.

Upon receiving the dynamic multi-RAT integration BSR, the AP may send a dynamic multi-RAT buffer status report complete message or a dynamic multi-RAT buffer status report failure message to the cellular controller (S640).

Having received the dynamic multi-RAT integration BSR from the cellular controller, the AP may send to the cellular controller a dynamic multi-RAT BSR complete message indicating that the message has been properly received and UL resources can be allocated to the multi-RAT UE.

Upon receiving the complete message, the cellular controller may allocate 10,000 bytes to the multi-RAT UE, among the total of 15,000 bytes of the predetermined UL resources, for example.

If the AP cannot allocate UL resources to the multi-RAT UE in response to the dynamic multi-RAT BSR, it may send a dynamic multi-RAT BSR failure message to the cellular controller. Upon receiving the failure message, the cellular controller may additionally allocate UL resources for the cellular network, corresponding to the amount of UL resources for the cellular network it has requested of the AP for use by the multi-RAT UE.

Alternatively, if the dynamic multi-RAT BSR failure message the cellular controller has received from the AP contains information indicating that the AP will allocate less UL resources than the cellular controller has requested for use by the multi-RAT UE, the cellular controller may additionally allocate uplink resources for the cellular network, corresponding to the amount by which the UL resources it has requested of the AP for use by the multi-RAT UE falls short of.

Figure 7:
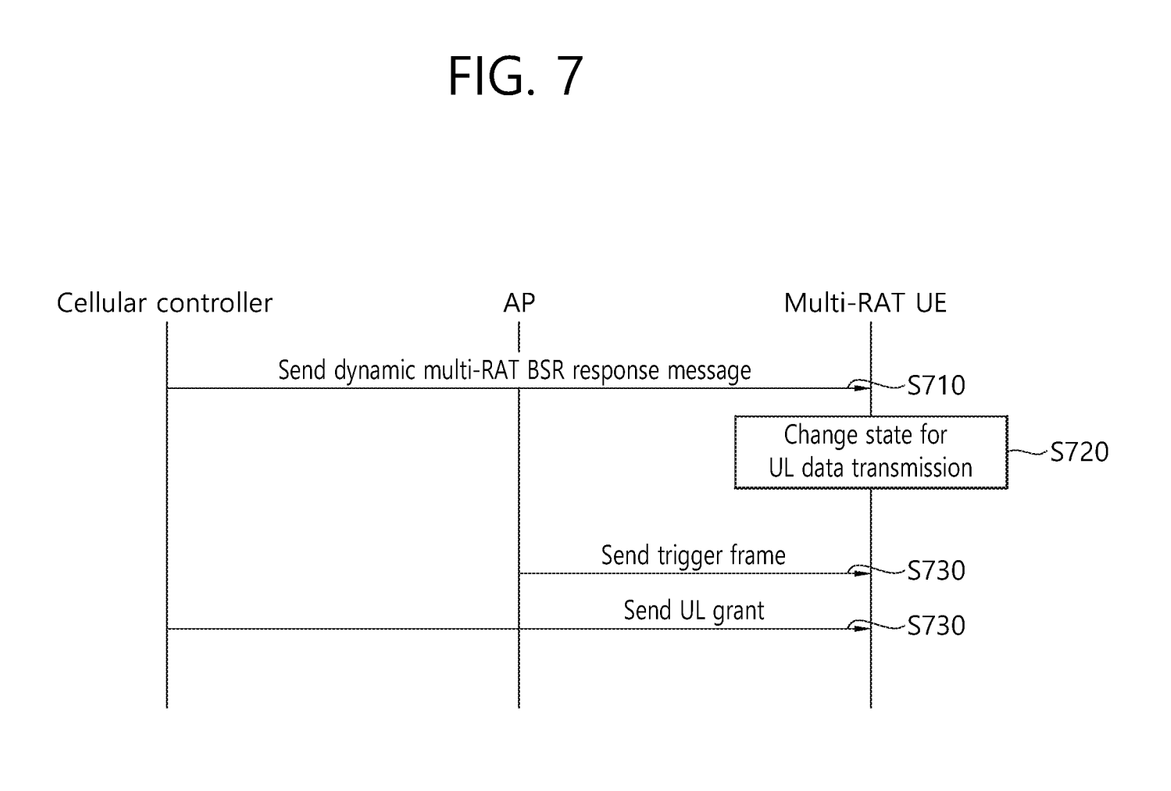
FIG. 7 is a control flowchart illustrating a dynamic multi-RAT integrated scheduling method according to an exemplary embodiment of the present invention.

FIG. 7 is a control flowchart illustrating a dynamic multi-RAT integrated scheduling method according to an exemplary embodiment of the present invention. FIG. 7 is a view illustrating a method for a cellular controller to schedule UL data to be transmitted over a cellular network and a WLAN.

Having received a dynamic multi-RAT integration BSR from a multi-RAT UE, a cellular controller may send a dynamic multi-RAT scheduling buffer status response message to the multi-RAT UE, in response to the dynamic multi-RAT integration BSR (S710).

If the cellular controller has properly received the dynamic multi-RAT integration BSR and decided to perform dynamic multi-RAT integrated scheduling for the multi-RAT UE through a cellular network and a WLAN, it may send the response message to the multi-RAT UE as a response to the dynamic multi-RAT integration BSR.

The dynamic multi-RAT BSR response message may contain information on whether the multi-RAT UE can communicate over the cellular network alone (cellular only), over the WLAN alone (Wi-Fi only), or over both the cellular network and the WLAN (cellular and Wi-Fi).

That is, the dynamic multi-RAT BSR response message may serve as a monitoring message containing information on which RAT the multi-RAT UE has to monitor in order to get scheduled for UL.

For example, if the cellular controller does not notify the multi-RAT UE of through which RAT the multi-RAT UE is scheduled for UL, the multi-RAT UE may not perform monitoring of RATs with no UL scheduling. That is, the multi-RAT UE may only monitor RATs with UL scheduling.

Such a monitoring message may be 2-bit information, and the 2 bits may indicate which RAT the multi-RAT UE has to monitor, among "cellular only", "WLAN only", "cellular and Wi-Fi". Such monitoring information corresponds to scheduling information indicating which wireless network has to provide UL data.

Having received monitoring information, the multi-RAT UE may change the state for UL data transmission depending on its mode (S720).

If the multi-RAT UE is in doze mode for the WLAN and receives scheduling information "Wi-Fi only" or "cellular and Wi-Fi", the multi-RAT UE may change its communication mode from doze mode to awake mode.

If the multi-RAT UE has received "cellular only" information, it maintains the doze mode for the WLAN even if a UL buffer is present.

If the multi-RAT UE is in awake mode for the WLAN and receives scheduling information "cellular only", the multi-RAT UE may request an AP for a transition to doze mode. To this end, the multi-RAT UE may set PM to 1 and transmit a frame to the AP, or may transmit a sleep mode request frame to the AP. Upon receiving an ACK signal for the transition to doze mode from the AP, the UE may make change its communication mode to doze mode.

When UL data is generated, the multi-RAT UE in the DRX mode for the cellular network may switch its communication mode from cellular DRX mode to cellular active mode and perform BSR on the cellular network. Upon receiving scheduling information "Wi-Fi only" from the cellular controller as a response to the BSR, the multi-RAT may change its communication mode from cellular active mode back to cellular DRX mode.

Once a predefined timer is started after a dynamic multi-RAT integration BSR is sent to the cellular controller, the multi-RAT UE may wait for a dynamic multi-RAT BSR response message before the timer expires.

If the multi-RAT UE does not receive the dynamic multi-RAT BSR response message before the timer expires, it may send the dynamic multi-RAT integration BSR again to the cellular controller.

In accordance with the cellular controller's uplink scheduling, the cellular controller and the AP may schedule UL resources for the multi-RAT UE (S730).

If the cellular controller decides to allocate UL resources for the cellular network to the multi-RAT UE, it may schedule UL resources and send a UL grant to the multi-RAT UE.

Having received a dynamic multi-RAT BSR response message from the cellular controller, the AP may schedule UL resources for the WLAN that need to be allocated for use by the multi-RAT UE, and send a trigger frame to the UE.

Meanwhile, if the multi-RAT UE becomes aware of which RAT it has to monitor through a dynamic multi-RAT BSR response message, there needs to be a limitation on how long UL monitoring has to be performed—that is, the time limit for monitoring. The multi-RAT UE may not perform UL monitoring on a specific RAT during the monitoring time or may make a transition to DRX mode or doze mode.

For example, if there is UL data that cannot be scheduled for UL through a specific RAT, the multi-RAT UE may switch the communication mode to power saving mode, thereby reducing the UE's power consumption.

Hereinafter, a method of limiting the UL monitoring time of the multi-RAT UE will be discussed.

According to an exemplary embodiment of the present invention, UL monitoring time can be limited depending on the amount of resources desired to be allocated as UL resources through each RAT.

The cellular controller may additionally include the ratio of UL resources for the cellular network and UL resources for the WLAN it has decided to allocate for use by the multi-RAT UE in a dynamic multi-RAT BSR response message and transmit the message to the UE.

Having received from the cellular controller information on the ratio of UL resources that will be allocated through each RAT, the multi-RAT UE may know the amount of data it can receive through each RAT relative to the data size it has transmitted. That is, the multi-RAT UE may monitor UL grants/trigger frames until it gets all the data it has to receive through each RAT.

Also, when the condition required for the multi-RAT UE to change to the existing DRX mode or doze mode is satisfied and the monitoring time is finished, the multi-RAT UE may change to DRX mode or doze mode even if a UL data buffer is present.

According to another exemplary embodiment of the present invention, if there is no UL grant/trigger frame transmitted through each RAT for a specified period of time, the monitoring by the multi-RAT UE may be limited.

Since the multi-RAT UE is able to check through a dynamic multi-RAT BSR response message whether the cellular controller has properly received a dynamic multi-RAT integration BSR, the existing RxTx BSR timer may not operate.

In this case, if the multi-RAT UE has received no UL grant or trigger frame for a specified period of time, the multi-RAT UE may stop the monitoring of UL grants or trigger frames through the corresponding RAT.

The multi-RAT UE may determine whether to perform UL monitoring through each RAT based on the scheduling information in the dynamic multi-RAT integration BSR received from the cellular controller, and start the timer for the RAT through which UL monitoring needs to be performed.

For example, if "Wi-Fi only" scheduling information is received through the dynamic multi-RAT BSR response message, the multi-RAT UE may start the Wi-Fi timer. Also, if "cellular only" scheduling information is received, the multi-RAT UE may start the cellular timer, and if "cellular/Wi-Fi" scheduling information is received, the multi-RAT UE may start the cellular timer and the Wi-Fi timer.

If the multi-RAT UE receives a UL grant or trigger frame from the cellular controller or the AP, the timer for the corresponding RAT may be re-started.

When the timer for a specific RAT is finished, the multi-RAT UE may stop the monitoring of a specific RAT UL grant or trigger frame. In this case, when the condition required for the multi-RAT UE to change to the existing DRX mode or doze mode is satisfied and the monitoring time is finished, the multi-RAT UE may change to DRX mode or doze mode even if a UL data buffer is present.

As above, the present invention provides a method in which a cellular controller dynamically allocates resources for a cellular network and a WLAN based on a multi-RAT integration buffer status report sent by a multi-RAT UE, while the cellular controller is obtaining information on the channel status, load, etc. of the cellular network and the WLAN.

Figure 8:
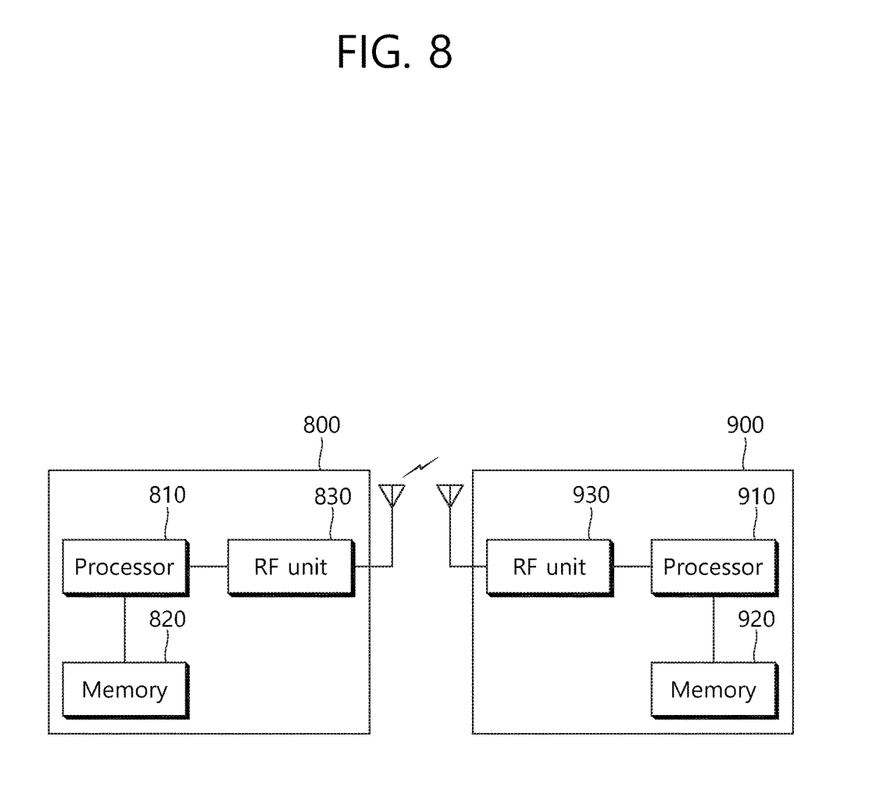
FIG. 8 is a block diagram of a wireless communication system according to an exemplary embodiment of the present invention.

FIG. 8 is a block diagram of a wireless communication system according to an exemplary embodiment of the present invention.

A base station 800 includes a processor 810, a memory 820, and an RF unit (radio frequency unit) 830. The processor 810 implements the proposed functions, processes and/or methods. The layers of the radio interface protocol may be implemented by the processor 810. The memory 820 is connected to the processor 810 and stores various information for running the processor 810. The RF unit 830 is connected to the processor 810 and sends and/or receives radio signals. The base station 800 of FIG. 8 may include the above-described cellular base station or EUTRAN eNB or IWME.

A UE 900 includes s a processor 910, a memory 920, and an RF unit (radio frequency unit) 930. The processor 910 implements the proposed function, process and/or method. The layers of the radio interface protocol may be implemented by the processor 910. The memory 920 is connected to the processor 910 and stores various information for running the processor 910. The RF unit 930 is connected to the processor 910 and sends and/or receives radio signals. The UE 900 of FIG. 8 may include the above-described multi-RAT UE.

The processor may include an ASIC (application-specific integrated circuit), other chipsets, a logic circuit and/or a data processing device. The memory may include an ROM (read-only memory), an RAM (random access memory), a flash memory, a memory card, a storage medium and/or other storage devices. The RF unit may include a base band circuit for processing a radio signal. When an embodiment is implemented in software, the above-described schemes may be realized in modules (processes, functions, etc.) for performing the above-described functions. The modules may be stored in the memory and executed by the processor. The memory may be positioned in or outside the processor and may be connected with the processor via various well-known means.

In the above exemplary system, the methods have been described in conjunction with flowcharts having a series of steps or blocks. However, the present invention is not limited to the order of the steps, and some steps may occur simultaneously or in an order different from the above-described steps. It may be understood by one of ordinary skill in the art that the steps in the flowcharts are not exclusive and some other steps may be added or one or more of the steps in the flowcharts may be deleted without affecting the scope of the present invention.

What is claimed is:

1. A method for performing, by a cellular controller, uplink (UL) data scheduling in a heterogeneous wireless communication network comprising a cellular network and a wireless local area network (WLAN), the method comprising:

receiving a multi-radio access technology (RAT) buffer status report (BSR) from a user equipment (UE);

determining uplink (UL) resources for the cellular network and the WLAN, respectively, based on the multi-RAT BSR;

receiving a complete message or a failure message for the multi-RAT BSR from a WLAN access device;

allocating the UL resources for the cellular network and the WLAN to the UE by using the UL resources for the WLAN as UL resources for the cellular network when the failure message for the multi-RAT BSR is received;

sending a multi-RAT BSR response message to the UE as a response to the multi-RAT BSR; and sending an UL grant to the UE to transmit UL data in the allocated UL resources.

2. The method of claim 1, further comprising:
sending the multi-RAT BSR to the WLAN access device when the UL resources for the cellular network and the WLAN are determined; and
allocating the UL resources for the cellular network to the UE when the complete message for the multi-RAT BSR is received.

3. The method of claim 1, wherein the multi-RAT BSR response message contains information on a monitoring time of a RAT the UE has to monitor.

4. The method of claim 1, wherein the multi-RAT BSR response message contains information on a RAT the UE has to monitor.

5. A cellular controller for performing uplink (UL) data scheduling in a heterogeneous wireless communication network comprising a cellular network and a wireless local area network (WLAN), the cellular controller comprising:

a signal transmitter/receiver; and
a processor connected to the signal transmitter/receiver,
wherein the processor receives a multi-radio access technology (RAT) buffer status report (BSR) from a user equipment (UE),
determines uplink (UL) resources for the cellular network and the WLAN, respectively, based on the multi-RAT BSR,
receives a complete message or a failure message for the multi-RAT BSR from a WLAN access device,
allocates the UL resources for the cellular network and the WLAN to the UE by using the UL resources for the WLAN as UL resources for the cellular network when the failure message for the multi-RAT BSR is received,
sends a multi-RAT BSR response message to the UE as a response to the multi-RAT BSR, and
sends an UL grant to the UE to transmit UL data in the allocated UL resources.

* * * * *